(No Model.)

J. L. INGALSBE.
DEVICE FOR SHAPING AND PARING THE HOOFS OF ANIMALS.

No. 250,736. Patented Dec. 13, 1881.

Witnesses:
Charles Selkirk
Richard P. Dunjary

James L. Ingalsbe
Inventor.
By his Attorney
Aly. Selkirk

UNITED STATES PATENT OFFICE.

JAMES L. INGALSBE, OF SOUTH HARTFORD, NEW YORK.

DEVICE FOR SHAPING AND PARING THE HOOFS OF ANIMALS.

SPECIFICATION forming part of Letters Patent No. 250,736, dated December 13, 1881.

Application filed May 21, 1881. (No model.)

*To all whom it may concern:*

Be it known that I, JAMES L. INGALSBE, of South Hartford, county of Washington, and State of New York, have invented a new and useful Improved Device for Shaping and Paring the Hoofs of Animals, of which the following is a specification.

My invention relates to a device for shaping and paring the hoofs of animals, in which several series of cutting-teeth are made with the shell sides of a tubular body which forms a handle for a hoof-paring knife attached to one of its ends.

The object of my invention is to produce a tool which will operate as a rasp, and have teeth which are adapted to be readily sharpened by an ordinary mechanic, and be provided with a hoof-paring knife which will be of hoof form, and adapted to be used for paring and cutting the hoof with both its plain and bow or curved edges. I attain these objects by means of the mechanism illustrated in the accompanying drawings, in which similar letters of reference refer to similar parts throughout the several views.

Figure 1:
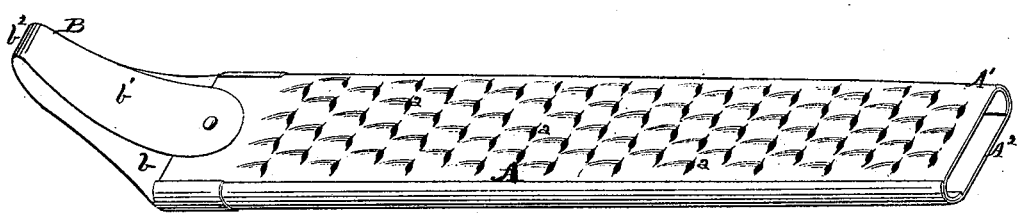
Figure 2:
Figure 3:
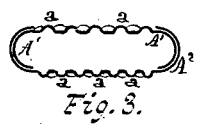
Figure 4:
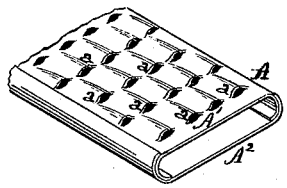
Figure 5:
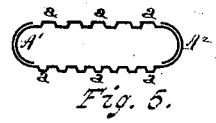
Figure 6:
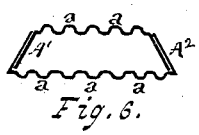
Figure 7:
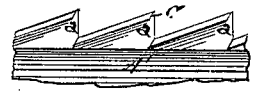

Figure 1 is a perspective view of the tool. Fig. 2 is a longitudinal sectional view. Fig. 3 is a cross-sectional view. Fig. 4 is a perspective view of a section of one of the side shells of the body of the tool, illustrating the cutting devices on an enlarged scale. Figs. 5 and 6 illustrate cross-sections of modifications of form of parts; and Fig. 7 is a sectional view, on an enlarged scale, of one of the cutting devices employed.

In the drawings, A is the body of the tool, which body is made of sheet cast-steel, or saw steel tempered to a degree about equal to the temper of a saw, and is tubular or hollow, as shown.

The drawings in Figs. 1, 3, and 4 show the body of the tool, to be made in sections, with section $A'$ held in connection with section $A^2$ by the side edge margins of the latter closing about the side edge margins of the former, and the said sections are shown to be slightly tapering, so that the side marginal edge portions of one of the sections will be made to sheath the side marginal edge portions of the other section, and either section may be replaced by a duplicate section, if selected.

Made with the sides of the tool are several series of cutting teeth or lips, or gouges or chisels, $a$. These series are arranged at intervals apart, in regular order preferably, while the cutting devices of each series are also arranged at short distances apart, and those of each series are so arranged in relation to those of its neighboring series that they will be alternate. These cutting devices $a$ $a$ are formed from the body of the steel sections by punching or cutting and raising their mouth portions outward from the plane of the outer surfaces of the said sections, as shown. The said cutting devices are each made on its inner side with an incline or angle of inclination, $c$, extending from its cutting-edge point inwardly, as illustrated in Fig. 7, and may be readily sharpened by a small file operated through the mouth of the cutting device in a line of direction which will be relatively oblique with the plane of the extension of the body of the tool.

It will be readily observed that these cutting devices may be made to be in either gouge or chisel form, and may be larger (or coarser) or smaller, (or finer,) and may be made from sheet-steel of a thickness of one thirty-sixth of an inch, about, or thicker or thinner, as selected, preference being given to the thickness first mentioned.

If selected, the cutting devices made with one of the sections may be coarser or finer than those made with the other section.

B is a hoof-paring knife made from sheet-steel, and with a bow or loop form, as shown. This paring-knife is preferably made with one of its side blades, $b$, extended in its width as it approaches the body A of this tool. Both edges of the limbs $b$ $b'$ of the loop-form knife B are sharpened, so that the knife is made to have quadruple edges, while the edges of the bow $b^2$ of the same are also sharpened. The shapes of the limbs $b$ $b'$, in their variation of width and form of line of the respective edges of said limbs, are such as to give to each portion of the cutting-edges of the knife a particular adaptation of use, and render the tool more convenient for paring the different portions of the hoof, while the edges of the bow of the knife are made to work in a more perfect manner. The limbs of the knife are set relatively at an angle with the longitudinal axes of the rasping-tool, so that section $A^2$ may be readily inserted or sheathed with section A' by the smaller end of the former being entered into the largest end of the latter.

This tool is to be employed the same as rasps or files heretofore employed for shaping and dressing a hoof, and the knife is also to be used in the same manner as the common hoof-paring knife, except as may result from the use of any of the forms of the quadruple edges of the knife, and as the angles of the lines of edges of the same.

I am aware that cutting or abrading teeth struck up from sheet-iron and tin have been before used in graters. Such cutting or abrading teeth I do not claim as being a part of my invention, as such cutting-edges would not be adapted to operate the same as the cutting devices employed by me with my improved tool.

Having described my invention, what I claim, and desire to secure by Letters Patent, is—

1. The improved tool A, made of sheet-steel, and with a tubular or hollow form, and provided with several series of cutting devices $a$, arranged as described, and formed, as described, with incline or angle $c$ running inwardly from the edge of the same, for operation substantially as set forth.

2. The improved tool A, made with a hollow or tubular form of sheet-steel, and composed of sections A' A², united together, so that the resistance offered to the cutting devices of one section will be borne by the other, and together they will form a hollow rasp or file, substantially as set forth.

3. The combination, with the tubular or hollow body A, made of sheet-steel, of cutting devices $a$, arranged in several series, and having their cutting-mouths made with an incline, $c$, running inwardly from the cutting-edges of said devices, substantially as and for the purpose set forth.

4. The hoof-paring knife B, made with a loop form by means of the limbs $b$ $b'$ and bow $b^2$, having their edges sharpened, in combination with the tubular or hollow steel body A, substantially as and for the purposes set forth.

JAMES L. INGALSBE.

Witnesses:
JAMES MICKEL,
EDWARD MATTHEWS.